United States Patent Office 2,960,988
Patented Nov. 22, 1960

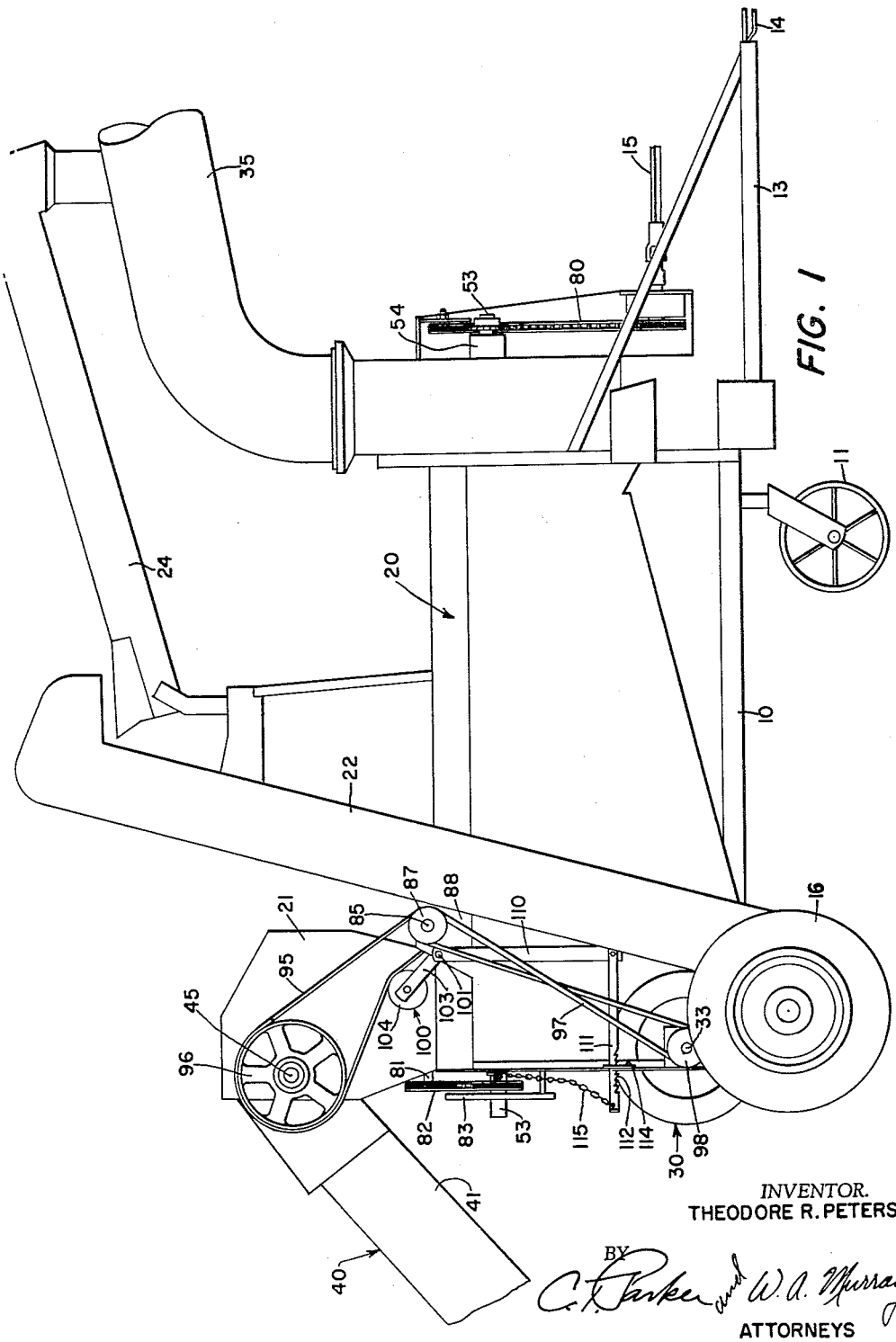

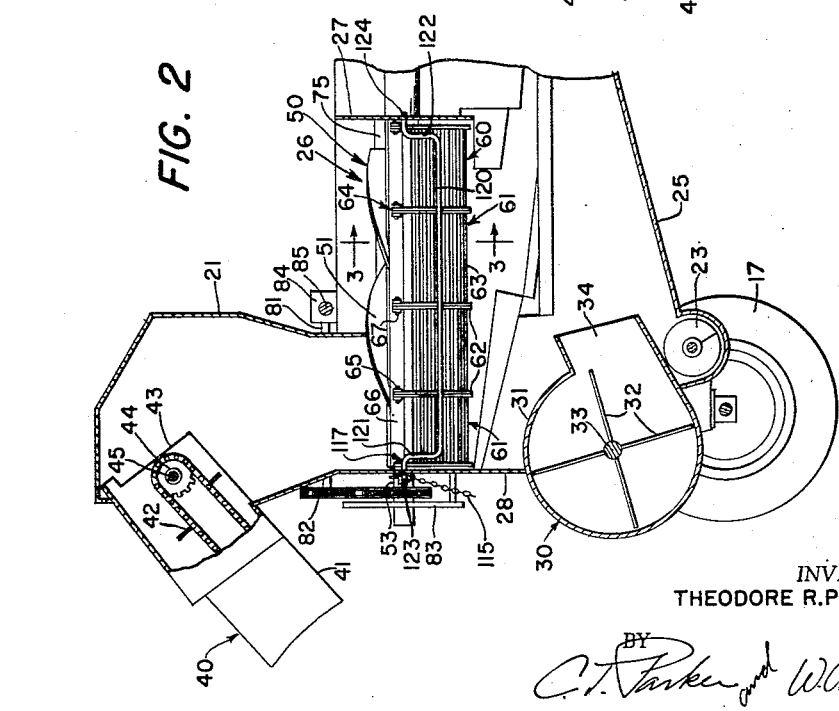

2,960,988
CORN SHELLER HAVING CONCAVE OVERLOAD RELEASE MEANS

Theodore R. Peterson, Irene, S. Dak.

Filed Dec. 26, 1957, Ser. No. 705,291

5 Claims. (Cl. 130—6)

This invention relates to a crop treating unit and particularly to the type of crop treating unit of the corn sheller variety. Still more particularly this invention relates to an automatic shutoff device on a corn sheller which will prevent the feeding of material into the shelling mechanism should a foreign object enter into the mechanism which would normally operate to do harm to the mechanism.

In the conventional type of corn sheller there is normally provided an elongated sheller housing structure in which is mounted a shelling cylinder and associated grille structure adjacent to the periphery of the cylinder. The cylinder and grille structure cooperate to dislodge the kernals of corn from the ear through a grating action on the ear. A conveyor feeds the ears of corn to one end of the housing structure.

In this type of corn sheller there is always created the problem of large stones or other type of foreign matter being fed into the shelling cylinder by the conveyor which operates to injure the shelling cylinder and its associated grille structure or in many instances to freeze or lock the cylinder against rotation. In either case, the conveyor will continue to feed ears of corn into the shelling structure creating a problem of clogging. In most instances, the lack of shelling action will not become apparent to the operator until considerable injury to the mechanism and clogging has occurred, thus necessitating a long delay prior to continuing with the shelling operation.

It is therefore the primary object of this invention to provide a grille assembly associated with the shelling cylinder which is composed of a plurality of axially alined arcuate shaped grille structures hinged to permit any of the grille structures to move away from the cylinder upon an overload of material, either in the form of excess feeding of ears or the feeding of a large stone or other foreign object, into the shelling cylinder, thereby permitting the overload to be removed prior to injury or clogging occurring in the shelling mechanism. The overload release device will be in the form of a shear pin which holds the grille structure in place during normal operation of the sheller.

It is also an object of this invention to incorporate with the above described grille structure and release device a rockable member which is effected by the grille structure moving away from the shelling cylinder to rock about its axis. Incorporated with the feeding conveyor is a drive mechanism having a type of clutch mechanism associated therewith which is controlled by the rockable member so as to automatically shut off the conveyor upon any of the plurality of grille structures moving away from the shelling cylinder. Consequently, should a rock pass into the shelling cylinder, the grille structure will react to move away from the cylinder which will automatically effect the drive mechanism on the conveyor so as to prevent continuous feeding of material into the sheller.

Other objects and advantages of the invention will become apparent to those skilled in the art as the nature of the invention is better understood following the description set forth in the present specification and as shown in the accompanying drawings.

Fig. 1 is a side view of the corn sheller with terminal portions, not important to a full understanding of the present invention, not shown.

Fig. 2 is a vertical longitudinal sectional view of the rear portion of the shelling unit.

Fig. 3 is a sectional view taken substantially along the line 3—3 of the Fig. 2.

Fig. 4 is a sectional view taken substantially along the line 4—4 of Fig. 3.

Fig. 5 is a rear right perspective of the rear portion of the sheller.

The sheller is composed of a main frame 10 supported at its forward end by a front wheel truck 11 and at its rear by a pair of rear wheels 16, 17. The front wheel truck 11 offers support for the forward end of the shelling unit and offers mobility to the unit. However, when the shelling unit is in transport, the wheel truck 11 is normally raised and support is afforded by the rear wheels 12 and the drawbar on a tractor, not shown, which is connected to the main frame 10 by means of the forwardly extending draft arm 13 which is rigid with the main frame 10. A clevis connection 14 provides connecting means to the tractor drawbar. Also provided is a drive shaft 15 which may operate from a tractor power take-off shaft, not shown, or any other type of power drive. In the present description, since provision is made for the implement to be drawn by a tractor, the front of the implement will be considered as that portion adjacent the clevis 14 and the rear considered as the opposite end of the implement.

A sheller housing structure, indicated in its entirety by the reference numeral 20 encloses the shelling mechanism and offers both support and housing for the shelling structure. At the rear of the housing structure 20 there is provided an upright hopper or inlet 21 through which the ears of corn are fed into the housing structure 20. A corn discharge elevator 22 is provided to receive corn from a cross auger conveyor 23 and to move the corn upwardly to a wagon conveyor 24. Kernals of corn are passed into the auger conveyor 23 over an inclined bottom plate 25 under a main shelling unit 26, which feeds the corn by gravity into the auger trough. Front and rear transverse upright panels 27, 28 are at opposite ends of the sheller unit 26.

Mounted on the housing structure 20 and at the rear of the sheller is a large fan 30 having a fan housing 31 and blades 32 mounted on a rotating drive shaft 33, all of which operate to direct a blast of air through the fan discharge opening 34 across the corn gravitating from the sheller mechanism 26 to the plate 25 for purposes of driving chaff and dirt to the forward end of the sheller and outwardly through a chaff and trash discharge duct 35.

At the rear of the sheller is a feed conveyor indicated in its entirety by the reference numeral 40 which includes a conveyor housing 41 which is connected at its upper end to the hopper 21 and encloses a continuous type of conveyor 42 having an upper discharge end 43 discharging into the hopper 21. The conveyor 42 is mounted over an upper drive sprocket 44 supported on a conveyor drive shaft 45.

The shelling unit 26 is composed of a shelling cylinder 50 having spiral flight means 51 which is either fixed to or integral with a central elongated cylindrical hub 52 which is supported on and driven by a longitudinally extending drive shaft 53. The shaft 53 extends the entire length of the sheller housing structure 20 and is journaled, as at 54, 55, at opposite ends in the end panels of the housing structure.

Surrounding the lower half of the cylinder 50 is a concave or grille assembly 60 composed of a plurality of grille structures 61 which are arcuate shaped to fit the peripheral contour of the cylinder 50 and are mounted on the housing structure 20 in end-to-end relation axially along the lower periphery of the cylinder 50. Each of the grille structures 61 are composed of axially spaced and semi-circular shaped frames 62 which are interconnected by a plurality of longitudinal rods 63. Each of the grille structures 61 is mounted by hinge means 64, to the housing structure 20. Specifically the hinge comprises a plurality of lugs 65 which are fixed to a longitudinally extending structural member 66 which may be treated as part of the housing structure 20 since opposite ends thereof are supported on the structure. The structural members 62 are suitably apertured to receive a pivot pin 67 which extends through the apertures and lugs 65. The hinges 64 operate to permit the grille structure 61 to swing, unless otherwise restricted, toward or away from the shelling cylinder 50.

The grille structures 61 are held in a position substantially adjacent the outer periphery of the shelling cylinder 50 by means of an overload release means 70 composed of a break pin 71 which extends through an aperture 72 in a lug 73 extending upwardly from the upper face of a longitudinally extending member 74 which interconnects the ends of the semi-circular structural members 62. Supported on the housing structure is a longitudinally extending angle iron 75 which has a horizontally disposed leg portion 76 which has longitudinally spaced openings 77 permitting the lugs 73 to pass. As indicated in Fig. 4, the openings 77 are such as to prevent the shear or break pins 71 from passing.

The drive for the entire shelling or crop treating unit is provided from the main drive shaft 15 and includes a chain drive 80 at the forward end of the sheller which operates to drive the sheller cylinder drive shaft 53. At the rear end of the sheller housing the cylinder drive shaft 53 drives a longitudinally extending countershaft 81 through means of a second chain drive 82. A plate 83 sets rearwardly of the chain drive 82 to afford shielding for the drive. A bevel gear transmission 84 is positioned at the forward end of the countershaft 81 and terminates in a cross shaft 85 which extends across and above the housing structure 20. At the right end of the cross shaft 85 there is provided a flat belt pulley 86 and a V-belt pulley 87. A triangular shaped support 88 extends upwardly from the housing structure 20 and provides suitable bearing support, as at 89, for the right end of the shaft 85.

The drive mechanism for the conveyor includes the flat belt pulley 86, a flat belt 95, and an associated flat belt pulley 96 which is fixed to the conveyor drive shaft 45. The V-belt pulley 87 operates to drive the fan drive shaft 33 by means of a V-belt 97 and an associated V-belt pulley 98 fixed to the fan drive shaft 33.

Other drive mechanisms, such as those required to drive the elevator 22, the auger conveyor 23, and the wagon conveyor 24 are not shown, since such drives are conventional in many of the commercial models of corn shellers and because details of the drive mechanism are not required for a full appreciation of the present invention.

A clutch mechanism in the form of a belt tensioning device 100 is provided in the flat belt drive 86, 95, 96 which operates the feed conveyor 40. The belt tensioning device comprises a transverse shaft 101 supported for rotation on the triangular shaped bracket 88 and the housing structure 20. On the shaft 101 are a pair of transversely spaced upwardly and rearwardly extending arms 102, 103. Supported on the arms 102, 103 is an idler pulley 104 which is positioned to contact the flat belt 95. As is apparent, rocking motion of the shaft 101 so as to move the idler pulley 104 toward the belt creates tension in the belt thereby making the belt drive effective to drive the conveyor. Conversely, rocking motion of the shaft 101 so as to move the idler pulley 104 away from the belt is effective to remove tension in the belt drive and to cause the belt to have a no-drive relation with the conveyor 40. The clutch or belt tensioning device 100, therefore, is associated with the belt drive 86, 95, 96 and is adjustable to effect the belt drive in a drive or no-drive relation with the conveyor 40.

Rocking action of the shaft 101 is created by movement of a downwardly extending arm 110, the lower end of which is connected to a forwardly extending link 111. The link 111 is provided with a plurality of longitudinally spaced teeth 112 at its lower edge. The arm 111 also moves fore-and-aft in a vertical slot 113 cut in a bracket 114 fixed to the rear face of the housing structure 20. The teeth 112 on the arm 111 will normally engage the lower edge of the slot 113 and will consequently hold the arm 110 and shaft 101 against movement. The weight of the arm 111 will normally hold the teeth in engagement with the lower edge of the slot 113 in effect therefore requiring a lifting action on the arm 111 to adjust the belt tensioning device 100.

The rear end of the link 111 is connected to the lower link of a depending chain 115, the upper end of which is connected to a rock arm 116. The rock arm 116 is fixed to a rockable or radius member 117 which is supported on the panels 27, 28 of the housing structure 20. Viewing Figs. 2 and 3, the rockable member 117 extends inwardly of the housing structure 20 and has an elongated central shaft portion 120 which is disposed longitudinally and adjacent to the grille structures 61. The elongated shaft portion 120 is integral with depending arm portions 121, 122, the upper ends of which are turned longitudinally as at 123, 124 to be supported on the rear and front panels 27, 28 respectively. It is the portion 123 of the rockable member 117 on which the arm 116 is directly fixed.

The crop treating or sheller unit operates in the following manner. Ears of corn are fed upwardly and forwardly to the discharge end of the conveyor where the ears will gravitate through the hopper 21 and onto the shelling cylinder 50. The lug type flight 51 on the cylinder 50 will operate in conjunction with the grille assembly 60 to cause the kernels of corn to be removed from the ears and to gravitate through the openings between the rods 63. In conventional manner, the corn will gravitate to the inclined floor plate 25 to be fed to the cross auger 23 and discharged by the discharge elevator 22 and wagon conveyor 24. Should it be desired to stop the conveyor 40 from feeding ears into the sheller, the rear end of the arm 111 may be raised manually and the entire arm pushed forwardly to cause the idler pulley 100 to disengage the belt 95. Without tension on the belt 95, the conveyor 42 will cease operation. Should a large stone, metallic part, or other foreign material pass through the conveyor 40 unnoticed, or should for other reasons the sheller unit 26 become overloaded to a degree where harm would be done to the flight lug 50 or to any of the grille structure 61, at least one of the shear pins 71 will shear and the particular grille structure 61 on which the overload occurs will drop from the locality of the shelling cylinder 50 to a position shown in dotted representation in Fig. 3. As the grille structure 61 drops about the pivot pin 67, the longitudinally extending shaft portion 120 of the rockable member 117 will be contacted and moved to the right. This will in turn cause a counterclockwise rotation of the rockable member 117 which will cause rockarm 116 to raise the arm 111 so as to prevent contact between the teeth 112 on the arm 111 and the lower edge of the slot 113. When this occurs, the gravitation force caused by the weight of the idler pulley 100 and its associated arms 102, 103 will cause the idler pulley to drop and the depending arm 110 to swing forwardly. This will automatically relieve the tension in the flat belt 95 and the conveyor 40 will cease operation. Thus, at any time that a foreign object or overload occurs in the shelling unit 26 so as to shear the pin 71, both the grille structure 61 will separate from the shelling cylinder 50 so as to prevent damage to either and also the conveyor feeding material in the shelling unit will automatically cease operation.

While only one form of the invention has been shown, it should be recognized that other forms and variations of the invention may exist without departing basically from the broad general principles herein taught. It should therefore be understood that while a preferred embodiment of the invention has been described in detail with the view of clearly and concisely illustrating the principles of the invention, it is desired not to limit or narrow the invention beyond the broad general concept herein claimed.

What is claimed is:

1. A corn sheller comprising an elongated sheller housing having an ear inlet permitting entry of corn into the housing structure; an elongated conveyor housing having a discharge end adjacent the ear inlet; a feed conveyor within the conveyor housing for moving ears of corn through the conveyor housing into the sheller housing via the ear inlet; drive mechanism including a belt drive operative to effect conveyance by the conveyor; a belt tensioning device associated with said belt drive adjustable to effect the belt drive in a drive or no-drive relation with the conveyor; an elongated shelling cylinder supported in the housing structure; a grille assembly associated with the shelling cylinder including a plurality of axially alined arcuate shaped grille structures adjacent the periphery of the shelling cylinder; hinge means mounting the grille structures on the housing structure for movement toward and away from the shelling cylinder; means operative to lock the grille structures in cooperating operative relation with the shelling cylinder, the latter means including overload release means therein permitting the grille structures to move away from the cylinder upon an overload between the cylinder and grille structures; a rockable member supported by the frame associated with the grille structures and responsive upon movement of the latter structures away from the cylinder to rock about its axis; and means between the belt tensioning device and the rockable member automatically adjusting the belt tensioning device to effect a no-drive relation between the belt drive and conveyor upon the grille structures moving away from the cylinder.

2. A corn sheller comprising an elongated sheller housing having an ear inlet permitting entry of corn into the housing structure; an elongated conveyor housing having a discharge end adjacent the ear inlet; a feed conveyor within the conveyor housing for moving ears of corn through the conveyor housing into the sheller housing via the ear inlet; drive mechanism operative to effect conveyance by the conveyor; a clutch device associated with said drive mechanism adjustable to effect the mechanism in a drive or no-drive relation with the conveyor; an elongated shelling cylinder supported in the housing structure; a grille assembly associated with the shelling cylinder including a plurality of axially alined arcuate shaped grille structures adjacent the periphery of the shelling cylinder; hinge means mounting the grille structures on the housing structure for movement toward and away from the shelling cylinder; means operative to lock each of the grille structures individually in cooperating operative relation with the shelling cylinder, the latter means including overload release means therein permitting individual grille structures to move away from the cylinder upon an overload between the cylinder and the respective grille structures; a rockable member supported by the frame associated with the grille structures and responsive upon movement of the latter structures away from the cylinder to rock about its axis; and means connecting the clutch device and the rockable member for automatically adjusting the clutch device to effect a no-drive relation between the drive mechanism and conveyor upon the grille structures moving away from the cylinder.

3. A corn sheller comprising an elongated sheller housing having an ear inlet permitting entry of corn into the housing structure; an elongated conveyor housing having a discharge end adjacent the ear inlet; a feed conveyor within the conveyor housing for moving ears of corn through the conveyor housing into the sheller housing via the ear inlet; drive mechanism operative to effect conveyance by the conveyor; a clutch device associated with said drive mechanism adjustable to effect the mechanism in a drive or no-drive relation with the conveyor; an elongated shelling cylinder supported in the housing structure; a grille assembly associated with the shelling cylinder adjacent the periphery of the shelling cylinder; hinge means mounting the grille assembly on the housing structure for movement toward and away from the shelling cylinder; means operative to lock the grille assembly in cooperating operative relation with the shelling cylinder, the latter means including overload release means therein permitting the grille assembly to move away from the cylinder upon an overload between the cylinder and grille assembly; a rockable member supported by the frame associated with the grille assembly and responsive upon movement of the latter away from the cylinder to rock about its axis; and means connecting the clutch device and the rockable member for automatically adjusting the clutch device to effect a no-drive relation between the drive mechanism and conveyor upon the grille assembly moving away from the cylinder.

4. A corn sheller comprising an elongated sheller housing; a feed conveyor means associated with the housing for moving ears of corn into the sheller housing including drive mechanism operative to effect conveyance by the conveyor and a clutch device associated with the drive mechanism adjustable to effect a drive or no-drive condition in the conveyor means; shelling mechanism supported in the housing structure including a shelling cylinder, an associated grille structure, and release means therein responsive to overload in the shelling mechanism to release the grille structure for movement away from the cylinder; a rockable member supported by the frame associated with the grille structure and responsive upon overload of the latter to rock about its axis; and means connecting the clutch device and the rockable member for automatically adjusting the clutch device to effect a no-drive condition in the conveyor means upon an overload in the shelling mechanism.

5. A crop treating unit comprising an elongated housing having a crop inlet; feed conveyor means moving crops into the housing via the ear inlet including drive mechanism adjustable to a drive or no-drive condition for effecting conveyance or non-conveyance respectively in the conveyor means; a crop treating cylinder supported in the housing structure; a concave associated with the cylinder; means mounting the concave on the structure for movement toward and away from the cylinder including a hinge at one end of the concave for connecting the concave to the housing structure and a shear pin connection to the housing structure at the opposite end of the concave permitting the concave to move away from the cylinder upon an overload of material between the cylinder and concave; a radius member adjacent to the concave operative to rock in response to movement of the concave away from the cylinder; and means connecting the radius member to the drive mechanism for automatically adjusting the mechanism upon rocking movement of the member to effect a no-drive condition in the drive mechanism.

References Cited in the file of this patent

UNITED STATES PATENTS

| | | |
|---|---|---|
| 1,261,562 | Langdon | Apr. 2, 1918 |
| 1,821,316 | Oakes | Sept. 1, 1931 |
| 2,044,653 | Wettlaufer | June 16, 1936 |
| 2,290,841 | Weinhold | July 21, 1942 |
| 2,298,830 | McGillis | Oct. 13, 1942 |
| 2,456,074 | Newhouse | Dec. 14, 1948 |
| 2,714,410 | Moller | Aug. 2, 1955 |